3,554,899
HYDROCRACKING PROCESS

Rowland C. Hansford, Yorba Linda, Calif., assignor to Union Oil Company of California, Los Angeles, Calif., a corporation of California
No Drawing. Continuation-in-part of application Ser. No. 488,712, Sept. 20, 1965, which is a continuation-in-part of application Ser. No. 339,897, Jan. 24, 1964, now Patent No. 3,267,022, which in turn is a continuation-in-part of application Ser. No. 150,129, Nov. 6, 1961. This application Nov. 26, 1968, Ser. No. 779,216
Int. Cl. C10g 13/02
U.S. Cl. 208—111                    12 Claims

ABSTRACT OF THE DISCLOSURE

Hydrocracking process for converting high-boiling hydrocarbons to lower boiling hydrocarbons, wherein the essential novel feature resides in utilizing, at temperatures above about 600° F., a unique class of catalysts comprising (1) a Group VIII metal-promoted crystalline zeolite component intimately composited with (2) an amorphous alumina-silica cogel component containing about 1–35 weight-percent of silica. At temperatures above about 600° F., these catalysts are found to display higher activities and lower deactivation rates than certain presumably analogous prior art catalysts wherein the amorphous component (2) contains higher silica ratios, while at temperatures below about 600° F. the relative activities and deactivation rates appear to be reversed.

PARENT APPLICATIONS

This application is a continuation-in-part of copending application Ser. No. 488,712, filed Sept. 20, 1965, now abandoned, which in turn is a continuation-in-part of Ser. No. 339,897, filed Jan. 24, 1964, now U.S. Pat. No. 3,267,022, which in turn is a continuation-in-part of Ser. No. 150,129, filed Nov. 6, 1961, and now abandoned.

BACKGROUND AND SUMMARY OF INVENTION

This invention relates to methods for the catalytic hydrocracking of hydrocarbons, especially high-boiling mineral oil fractions, to produce lower boiling fractions such as gasoline or jet fuel, and is particularly directed to certain novel catalysts for use therein. The new catalysts comprise as the essential active component a zeolitic cracking base combined with a minor proportion of a transitional metal hydrogenating promoter. More specifically, the zeolitic cracking base is a hydrogen and/or polyvalent metal form of certain crystalline alumino-silicates, preferably characterized by (1) relatively uniform crystal pore diameters of between about 6 and 14 A., preferably 9 to 10 A., and (2) a silica-alumina mole-ratio greater than 3, and preferably between about 3 and 6. The hydrogenating promotor may comprise any one or more of the transitional metals, their oxides or sulfides, and particularly the metals of Group VI–B and Group VIII, and their oxides and sulfides.

The combination of the zeolitic cracking base with the hydrogenating promoter is further compounded and copelleted with the second essential catalyst component, viz., an alumina-silica cogel adjuvant containing about 1–35% $SiO_2$ and 65–99% $Al_2O_3$ on a dry weight basis. The copelleted catalysts are found to display an optimum combination of high activity, low deactivation rates and good mechanical stability, resulting from the synergistic combination of the cogel adjuvant and the crystalline zeolite component.

It has recently been discovered that the crystalline zeolites of this invention, when converted to a hydrogen and/or polyvalent metal form and promoted with a Group VIII metal, constitute catalysts of extremely high intrinsic hydrocracking activity. These zeolite catalysts are many times as active, on an equal volume basis, as the more conventional hydrocracking catalysts based on amorphous silica-alumina cogels. This improved activity is believed to arise from the much higher concentration of active acidic cracking centers associated with the crystalline zeolites, as compared to the amorphous catalysts.

The zeolite catalysts however suffer from the disadvantages of higher manufacturing costs, and also the greater difficulty involved in preparing pellets of suitable mechanical strength and stability. In my U.S. Pat. No. 3,267,022 I have shown that the effective cost of the zeolite catalysts can be materially reduced by simply diluting the powdered zeolite catalyst with substantial amounts of certain relatively inexpensive amorphous materials, and copelleting the mixture. The surprising aspect of this discovery was that, on an equal bulk volume basis, the diluted and copelleted catalysts displayed a hydrocracking activity at least equal to, and in most cases higher than, the activity of the undiluted zeolite catalyst in the form of isometric pellets having a bulk density of 0.7 gram/ml. or higher. At the same time, the additional benefit was obtained that, under proper conditions, the amorphous component also functions as an effective binder, giving pellets of materially improved mechanical stability.

The present invention is based on my further discovery that the specific alumina-silica cogel adjuvants of this invention give unexpected further advantages in copelleted zeolite catalyst composites, as compared to the broad class of amorphous materials disclosed and claimed in my said Pat. No. 3,267,022, and as compared to other presumably equivalent materials such as alumina, or silica-rich cogels of alumina and silica, which have been employed as "matrices" for zeolite catalysts in the prior art (see U.S. Pats. Nos. 3,140,249, 3,210,267, and 3,140,251). Specifically, it has been found that, at hydrocracking temperatures above about 600° F., the catalyst composites of this invention are more active, and show a lower rate of deactivation, than do analogous prior art composites containing silica-rich (e.g., 85% $SiO_2$) cogels of silica and alumina in place of the silica-lean (e.g., 5% $SiO_2$) cogels employed herein. This is most surprising in that the silica-rich cogels are known to be more active cracking catalysts per se than are the silica-lean cogels. Another surprising aspect of the invention is that, at hydrocracking temperatures below about 600° F., the above factors are reversed, i.e., the prior art composites containing the silica-rich cogels show a higher activity and a lower deactivation rate than do the analogous composites of this invention containing the silica-lean cogels.

To take advantage of the superior available activity in the diluted catalysts of this invention, it is contemplated to use these catalysts at higher liquid hourly space velocities than would be required under the same conditions, and at the same feed throughput and conversion conditions, to obtain the same conversion with corresponding zeolite catalysts diluted with silica-rich cogels of alumina and silica. Alternatively, it may be desirable in some cases to utilize the superior activity to obtain a conversion temperature advantage. In this case, the silica-lean cogel-diluted catalyst would be employed at lower hydrocracking temperatures than would be required to obtain the same conversion at the same space velocity with the corresponding silica-rich cogel-diluted catalyst. The space velocity advantage is utilized where capital investment in reactors and catalyst inventory is the primary consideration, and the temperature advantage is normally utilized where long run lengths and superior product distribution are the primary desired objectives.

The intrinsic activity of the catalysts of this invention is derived principally from the zeolitic cracking bases in their hydrogen and/or polyvalent metal forms. These crystalline zeolites consist basically of a three-dimensional framework of $SiO_4$ and $AlO_4$ tetrahedra, the $SiO_2/Al_2O_3$ mole-ratio being at least about 2, and preferably between about 3 and 6. They normally display relatively uniform crystal pore diameters between about 6 and 14 A., usually 9–10 A. Suitable zeolites found in nature include for example mordenite, erionite, chabazite and faujasite. Suitable synthetic zeolites include for example those of the "B," "Y," "X," or "L" crystal types, or synthetic forms of the natural zeolites noted above, especially synthetic mordenite. The preferred zeolites are those of the "Y" crystal type, or synthetic faujasite.

The zeolites employed herein are "crystalline" in the sense that they comprise an ordered structure capable of being detected by electrooptical diffraction techniques, normally by X-ray diffraction, giving a consistent crystallographic pattern. Such an ordered structure can persist even after some of the structural silica or alumina is removed from the crystal lattice, as by leaching with acids or alkalis, or by other physical or chemical methods. Sometimes the ordered structure may become so attenuated as to fail to diffract X-rays, but in such cases other electrooptical methods, such as electron beam diffraction methods may be utilized.

The active forms of the zeolites are those wherein most or all of the original zeolitic alkali metal content has been replaced by hydrogen ions and/or polyvalent metal ions. The total zeolitic cation content of the final zeolite component should comprise at least about 50%, and preferably at least about 80%, of cation-equivalents of hydrogen ions and/or polyvalent metal ions. The term "cation-equivalent" refers to gram-atoms of each cation species times its charge. For example, a zeolite comprising per unit of weight, 0.1 gram atoms of sodium ions, 0.3 gram atoms of hydrogen ions and 0.2 gram atoms of trivalent rare earth metal ions, would contain in cation equivalents, 10% sodium equivalents, 30% hydrogen equivalents, and 60% rare earth equivalents.

The preferred Y zeolites of this invention may be prepared as disclosed in U.S. Pat. No. 3,130,007. The general method consists in first aging an aqueous sodium aluminosilicate mixture at relatively low temperatures of, e.g., 10–40° C., then heating the mixture at temperatures between about 40° and 125° C. until crystals are formed, and separating the crystals from the mother liquor. The resulting Y zeolites correspond to the general formula: $0.9 \pm 0.2\ Na_2O:Al_2O_3:nSiO_2:xH_2O$, where $n$ is a number from 3 to about 6 and $x$ is any number up to about 10.

The "decationized," or hydrogen form of the Y zeolite may be prepared by ion-exchanging the alkali metal cations with ammonium ions, or other easily decomposable cations such as methyl substituted quaternary ammonium ions, and then heating to, e.g., 300°–400° C., to drive off ammonia, as is more particularly described in U.S. Pat. No. 3,130,006. The degree of decationization, or hydrogen exchange, should be at least about 20%, and preferably at least about 40% of the maximum theoretically possible.

Low-silica zeolites such as the X molecular sieve normally cannot be converted to crystalline 100% hydrogen forms; complete collapse of the crystal structure occurs when the ammonium zeolites are heated to decompose the ammonium ions. In these cases it is necessary to convert the sodium zeolites to polyvalent metal forms, preferably rare earth metal forms, in order to achieve a stable and active crystal form. Suitable rare earth metal zeolites are described in U.S. Pat. No. 3,304,254. Rare earth metals include cerium, lanthanum, praseodymium, neodymium, illinium, samarium, gadolinium, europium, terbium, dysprosium, holmium, erbium, thulium, scandium, yttrium and lutecium.

Mixed, hydrogen-polyvalent metal forms of the zeolites are also contemplated. Generally, such mixed forms are prepared by subjecting the ammonium zeolite to a partial back-exchange with polyvalent metal salt solutions. The resulting polyvalent metal-ammonium zeolite may then be heated at, e.g., 400–900° F. to prepare the polyvalent metal-hydrogen form. Here again, it is preferred that at least about 20% of the monovalent metal cations be replaced with hydrogen ions. It is further preferred that at least about 10% of the monovalent metal cations be replaced by polyvalent metal ions, e.g., magnesium, calcium, zinc, chromium, the rare earth metals, or the like, for this is found to improve the hydrolytic stability of the resulting catalysts. A still further preference to be observed for maximum activity is that not more than about 20% of the original alkali metal cations (3% by weight of $Na_2O$) shall remain in the zeolite component of the catalyst.

Hydrogenation activity is imparted to the zeolitic cracking base by adding a minor proportion, e.g., 0.05–20%, of one or more of the Group VI–B and/or Group VIII metals, preferably a Group VIII noble metal. Specifically, it is preferred to employ about 0.1% to 3% by weight of palladium, platinum, rhodium, ruthenium or iridium. These Group VIII metals may be added by impregnation of the calcined hydrogen zeolite, but preferably they are added by ion exchange during, or directly after the ammonium ion-exchange step, i.e., before the ammonium zeolite is decomposed to form the hydrogen zeolite.

To incorporate the Group VIII metals by ion exchange, the ammonium zeolite, still in a hydrous form, is digested with an aqueous solution of a suitable compound of the desired metal wherein the metal is present in a cationic form. Preferably, fairly dilute solutions of the Group VIII metal salts are employed, and it can be assumed that there will be a substantially quantitative exchange of ammonium ion for the Group VIII metal. The exchanged metal-ammonium zeolite is then filtered off, washed and dried to about 5–20% water content. The resulting partially hydrated metal-ammonium zeolite powders are then normally copelleted with the alumina-silica cogel adjuvant. Alternatively, the ammonium zeolite may be copelleted with the adjuvant prior to the addition of hydrogenating metal, and the latter may then be added to the copelleted composite, so as to impregnate both the zeolite and the adjuvant. In either case, the final calcining is normally performed after the pelleting operation.

The alumina-silica cogel adjuvants selected for use herein appear to possess an ideal combination of chemical and physical properties for the required use. Their average pore diameter is generally between about 50 and 150 A. (these pore sizes referring to pores in the individual particles, and not the interparticle pores). Pores of this size are sufficiently large that substantially no diffusion limitations will appear in pellets of the normal size, i.e., between about $\frac{1}{16}$ and $\frac{3}{8}$-inch, over the normal pelleting pressure ranges. Thus, the mixture of zeolite catalyst and adjuvant can be pelleted under pressures sufficient to achieve substantially any desired hardness without encountering the diffusion limitations which occur upon pressure-pelleting of the zeolite component alone. Further, these adjuvants possess desirable binding properties when hydrated to the extent of, e.g., 20–50 weight-percent water, so that the deficiencies in mechanical stability of the pure zeolite pellets are substantially overcome without resorting to high-pressure pelleting.

The adjuvants of this invention consist of coprecipitated, alumina-silica cogels, wherein silica is the minor component. These compositions may contain from about 1% to 35%, and preferably from 2% to 20% by weight of $SiO_2$ on a dry basis, the balance being substantially $Al_2O_3$. It has been found, in addition to the advantages previously noted, that these low-silica cogels are superior to alumina alone, silica alone, or silica-alumina cogels wherein silica is the major component, in respect to mechanical stability of the pellets obtained by copelleting the respective adjuvants with the zeolite component.

It has long been known that, due to the crystalline nature of the zeolites employed herein, it is difficult to compress the crystals into pellets having adequate mechanical strength and stability. Some of the conventional binders which have been employed, such as alumina or clays, do give adequate initial mechanical strength (crushing strength), but the factor of "mechanical stability" is still deficient. "Mechanical stability" refers to the ability of the pelleted composition to retain an adequate degree of crushing strength after it has been subjected over a long period of time to conditions prevailing in adsorptive and catalytic contacting processes involving periodic changes in the partial pressure ratio of polar/nonpolar compounds in the contacting zone. Typically, in adsorption and in catalytic processing, the pellets may alternately come in contact with liquid hydrocarbons, hot stripping gases, hydrogen, steam, and oxidative regeneration gases and their acidic byproducts. In addition, inadvertent process upsets sometimes lead to contacting with liquid water, or to overheating. In all these cases, the alternating displacement of adsorbed, relatively nonpolar compounds by relatively polar compounds, and vice versa, leads to the development of internal stresses and strains resulting eventually in crumbling and decrepitation. It is hence necessary to provide mechanical stability in addition to adequate initial crushing strength. The preferred alumina-silica cogel adjuvants employed herein appear to be unique in providing a greater degree of mechanical stability, and usually of initial crushing strength, than other conventional binders.

In one modification of the invention, the powdered adjuvant material may be modified by the incorporation therein of a hydrogenating promoter, which may be the same as or differernt from the hydrogenating promoter used on the zeolite component. This modification is particularly desirable in connection with the treatment of high-end-point, nitrogen-containing feedstocks boiling above about 650° F. and up to about 1,000° F. The heavy polycyclic hydrocarbons and nitrogen compounds in the high-end-point feedstocks tend to plug the pores of the zeolite crystals, but may be effectively hydrogenated, and hydrocracked if desired, by contact with the active surface area of the adjuvant when modified by the incorporation of a hydrogenating promoter. This is feasible in view of the larger average pore diameter of the adjuvant material. The hydrogenating promoter is preferably added to the adjuvant before compounding with the zeolite component.

The optimum proportion of adjuvant material to be employed in the finished catalyst will vary considerably, depending upon the particular zeolite catalyst, the specific adjuvant employed, and the particular feedstock which is to be converted. In general, it may be said that any proportion of the adjuvant will benefit the catalyst to some extent, both in mechanical strength and in efficiency of utilization of the active zeolite component. Optimum proportions generally range between about 10% and 80% by weight of the final catalyst composition, with the preferred range lying between about 20% and 50%. Normally it is desirable to employ the critical proportion of adjuvant which results in most economical utilization of the active zeolite component, considering both the cost per pound of catalyst and the reactor size required for its utilization in the desired service. This proportion will be relatively high, e.g., 40-80%, for highly active zeolite catalyst components wherein 80-100% of the ion-exchange capacity is satisfied by hydrogen ions, and the proportion will be relatively low, e.g., 10-40% by weight, when the zeolite component is relatively less active, as where only about 20-50% of the ion-exchange capacity is satisfied by hydrogen ions. In most cases however it is preferred to use at least about 15-20% by weight of adjuvant from the standpoint of obtaining adequate mechanical stability of the pellets.

The copelleting of the zeolite and the adjuvant powders may be effected by conventional methods of die-compression, extrusion of the moistened mixture, prilling, or any other method capable of producing agglomerates of suitable size and shape, normally cylindrical pellets or spherical beads having a maximum dimension of about $\frac{1}{16}$–$\frac{3}{8}$ inch.

The hydrocracking feedstocks which may be treated herein include in general any hydrocarbon or mixture of hydrocarbons, boiling above the boiling range of the desired product. Included primarily are mineral oil fractions boiling above the conventional gasoline range, i.e., above about 300° F. and usually above about 400° F., and having an end-boiling-point of up to about 1,000° F. This includes straight run gas oils and heavy naphthas, coker distillate gas oils and heavy naphthas, deasphalted crude oils, cycle oils derived from catalytic or thermal cracking operations, and the like. These fractions may be derived from petroleum crude oils, shale oils, tar sand oils, coal hydrogenation products and the like. Specifically, it is preferred to employ feedstocks boiling between about 400° and 900° F., having an API gravity of 20 to 35°, and containing at least about 30% by volume of acid-soluble components (aromatics+olefins). Organic nitrogen contents may range between about 1 and 2,000 p.p.m., preferably between about 5 and 100 p.p.m. Sulfur compounds may also be present.

An important feature of the hydrocracking process resides in the use of temperatures considerably lower than those employed in connection with conventional cogel catalyst, i.e., below about 850° F., but higher than the minimum operable temperatures for zeolite catalysts, i.e., above about 600° F. As previously noted, it is only in this temperature range that the unique catalysts of this invention appear to display their superior activity and resistance to deactivation. At space velocities of about 1.0 to 8.0, it is contemplated herein to commence the hydrocracking runs at temperatures between about 550° and 650° F. to obtain 30–80% conversion to gasoline per pass, and continue to a terminal temperature of about 750° to 850° F., with at least half of the run being carried out at temperatures in the 600°–750° F. range. At pressures between about 500 and 3,000 p.s.i.g., run lengths of at least about three months are entirely feasible, and usually up to about one year or more. Such runs are generally not possible with conventional hydrocracking catalysts, except by resorting to uneconomically low space velocities in the range of about 0.1 to 0.5.

In the above or other types of hydrocracking operations, it is contemplated that the catalysts may be used under the following operating conditions:

|  | Operative | Preferred |
| --- | --- | --- |
| Temperature, ° F | 550–850 | 600–800 |
| Pressure, p.s.i.g | 500–3,000 | 800–2,500 |
| LHSV | 1.0–20 | 1.5–5.0 |
| H₂/oil ratio, m.s.c.f./b | 1–20 | 3–15 |

The selection of specific operating conditions within the above ranges will depend upon many factors, principally the nature of the feedstock. In particular, the operating temperature for a given conversion is very sensitive to nitrogen content of the feed. Feeds containing less than about 1 p.p.m. of nitrogen can be hydrocracked in the low temperature ranges. For feeds richer in nitrogen, exemplary initial temperatures for obtaining about 50% conversion of a 750° F. end-point gas oil to 400° F. end-point gasoline per pass, at 1.5 LHSV and 1,500 p.s.i.g., are as follows:

| Feed nitrogen content, p.p.m. | Initial hydrocracking temp., ° F. |
| --- | --- |
| 1–10 | 550–580 |
| 10–50 | 580–680 |
| 50–2,000 | 680–720 |

An important feature to observe at this point is that, although higher temperatures are required for nitrogen-containing feeds, these temperatures are relatively stable, and the desired conversion can be maintained with very gradual temperature increases of, e.g., 0.01–2° F. per day until the 850° F. terminal temperature is reached. This is in sharp distinction to the temperature-increase requirements for conventional, amorphous silica-alumina hydrocracking catalysts; with these conventional catalysts, employed under the same conditions, steep, progressive temperature increases are required, even with feeds containing as little as 1 p.p.m. of nitrogen. A typical such operation using a 5-p.p.m. nitrogen feed, may require temperature increases of 5–10° F. per day to maintain constant conversion, resulting in a run length of only about 1–2 months or less.

The following examples are cited to illustrate the techniques and results obtainable by the process of this invention, but are not to be construed as limiting in scope:

EXAMPLE I

This example illustrates the desirable combination of pellet strength and catalyst activity resulting from the co-pelleting of alumina silica hydrate with a hydrogen-magnesium Y zeolite catalyst. The initial zeolite catalyst component was a 0.5% Pd-ammonia Y sieve zeolite which had been partially back-exchanged with magnesium (to give 3.5 weight-percent MgO) and dried to a water content of about 20 weight-percent. Several lots of this zeolite catalyst component were mixed with varying proportions of spray-dried alumina trihydrate containing 5 weight-percent of coprecipitated silica gel. In some cases the alumina-silica gel was impregnated with 0.2–0.5% by weight of palladium. The powdered mixtures were then compressed into ⅛" pellets, dried and calcined (to convert the ammonia zeolite to the hydrogen form) and tested for activity and mechanical stability.

Activity was measured in terms of temperature required to give 55 volume-percent conversion to 400° F. end-point gasoline after 90 hours on-stream at 1,000 p.s.i.g., 1.5 LHSV and 8,000 s.c.f./b. of hydrogen, using a hydrofined, 750° F. end point gas oil feed.

Pellet strength and stability was measured (before use in the activity test) by rehydrating and recalcining the pellets, then determining the average crushing strength and comparing with the original crushing strength of the pellets. In addition, determinations were made on the weight-percent of pellets which were broken or shattered during the activity test runs. The results were as follows:

TABLE 1

| | Catalyst No. | | | | | |
|---|---|---|---|---|---|---|
| | 1 | 2 | 3 | 4 | 5 | 6 |
| Composition, wt. percent: | | | | | | |
| 95% Al₂O₃, 5% SiO₂ cogel | 0.0 | 20 | 25 | 30 | 50 | 50 |
| Percent Pd on Al₂O₃, SiO₂ | 0.0 | 0.3 | 0.0 | 0.5 | 0.2 | 0.0 |
| 0.5% Pd-zeolite | 100 | 80 | 75 | 70 | 50 | 50 |
| Bulk Density, g./ml. | 0.62 | 0.73 | 0.75 | 0.72 | 0.73 | 0.76 |
| Activity, ° F. for 55% conversion | 542 | 541 | 539 | 528 | 559 | 579 |
| Crushing Strength, lbs.: | | | | | | |
| Before calcining | 11.5 | 15.4 | 15.9 | 19.3 | 13.2 | 13.3 |
| After calcining | 21.3 | 35.1 | 32.0 | 33.1 | 27.3 | 27.4 |
| After rehydration and recalcining | a (9.6) | 16.4 | 20.7 | 20.9 | 17.8 | 16.9 |
| Wt. percent broken pellets, after activity test | 2.3 | | | <0.3 | 0.0 | <0.3 | a Estimated on basis of 45% strength retention found for similar catalysts.

The superior mechanical stability of the alumina-silica cogel-containing catalysts is readily apparent. Though the activities on a bulk volume basis are in some cases (catalysts 5 and 6) slightly lower than that of the undiluted catalyst 1, they are all superior, based on data obtained in other runs, to the activity of the undiluted catalyst compressed into pellets of 0.7 bulk density.

EXAMPLE II

This example demonstrates the superior mechanical stability of the preferred catalysts wherein the adjuvant is an alumina-silica cogel containing a minor proportion of silica, as compared to a 100% alumina adjuvant.

A palladium-magnesium-hydrogen-Y-molecular sieve catalyst was prepared by first converting a sodium Y molecular sieve ($SiO_2/Al_2O_3$ mole ratio=4.9) to the ammonium form by ion exchange with ammonium chloride solution (90% replacement of Na ions by $NH_4$ ions), followed by a partial back-exchange with an aqueous magnesium chloride solution to replace about 45% of the $NH_4$ ions with magnesium ion (3.6% by weight MgO), followed by the addition of 0.5 weight percent of palladium by ion exchange, then draining and drying to a water content of about 15 weight-percent.

The foregoing zeolite catalyst powder was then employed to prepare a series of 5 different copelleted catalysts, using as the adjuvant either spray dried alumina, or spray dried alumina-silica cogel containing 5 weight-percent SiO₂. In each case, the catalyst powder was slurried in an aqueous suspension of the adjuvant at pH levels indicated in Table 2. Each of the resulting slurries was then filtered and dried to about 15–20 weight-percent water. The dried filter cakes were then granulated through a 20 mesh screen, mixed with 0.5 percent graphite and compressed into ⅜-inch pellets having 8–10 pounds crushing strength before calcining. These pellets were then crushed and regranulated through a 14-mesh screen, mixed with another 0.5 weight-percent graphite plus 0.5 weight-percent sterotex, then repelleted and calcined in dry air at 920° F. for 10 hours.

The resulting pellets were then tested for crushing strength and mechanical stability by test procedures described in Table 2. (Crushing strengths were measured by placing an individual pellet in axially horizontal position on a flat plate and measuring the total force in pounds required to crush the same, the force being applied from above through a disc bearing on the top surface of the pellet.) The results obtained were as follows:

TABLE 2

| | Catalyst No. | | | | |
|---|---|---|---|---|---|
| | 7 | 8 | 9 | 10 | 11 |
| Adjuvant (20 wt. percent) | (1) | (2) | (1) | (2) | (1) |
| pH of slurry | 8.2 | 7.9 | 10.0 | 9.8 | 6–7 |
| Av. crushing strength of calcined pellets, lbs. | 34.0 | 31.9 | 37.2 | 22.9 | 21.6 |
| Stability Tests: | | | | | |
| Water Test ³, percent of pellets: | | | | | |
| Undamaged | 96 | 4 | 92 | 28 | 100 |
| Slightly cracked | 4 | 20 | 0 | 12 | 0 |
| Heavily cracked | 0 | 76 | 8 | 60 | 0 |
| Kerosene Test ⁴, percent of pellets: | | | | | |
| Undamaged | 32 | 0 | 12 | 0 | 44 |
| Slightly cracked | 20 | 8 | 32 | 8 | 32 |
| Heavily cracked | 48 | 92 | 56 | 92 | 24 |

¹ 95% Al₂O₃, 5% SiO₂.
² Al₂O₃.
³ Calcined 2 hrs. at 600° C. in ambient air cooled, in desiccator, immersed in water, air dried for 16 hrs.
⁴ Calcined pellets immersed in dry kerosene for 1 hr., drained on filter paper and dried for 2 days in ambient (wet) air.

From the foregoing data it is apparent that at any given pH level, the alumina-silica cogel adjuvant gave catalysts of superior mechanical stability than did pure alumina gel. It is evident also that the pH levels of 6 to 8.2 gave pellets of greater mechanical stability than were obtained at pH 10.

Although the mechanical stability tests reported above show that even with the preferred alumina-silica adjuvant, substantial cracking of the pellets occurred, these stability tests are much more severe than would be encountered in commercial use of the catalysts. The test procedures were designed to accentuate relative differences between the catalysts, and do not necessarily indicate that these same quantitative results would be obtained in any given commercial application. It has been confirmed however that the relative differences in pellet stability shown by the above tests do positively correlate with relative pellet stability in extended hydrocracking runs involving periodic variations in the partial pressure ratios of polar/nonpolar compounds, e.g., water/hydrocarbon ratios.

EXAMPLE III

In order to evaluate more precisely the effect on pellet stability of the alumina/silica ratio in the adjuvant, another series of catalysts was prepared from the same zeolite catalyst component described in Example II, co-pelleted with the various adjuvants indicated in Table 3. In this case however, instead of employing the slurry-mixing technique of Example II, the powdered zeolite component was dry mixed with the respective adjuvant compositions in a twin-shell blender. 1% of graphite powder was mixed into the dry, mixed powders and the product was slugged into $\frac{3}{8}$-inch tablets in a rotary tableting machine. The tablets were granulated through an 8-mesh screen and then ground and sifted through a 14-mesh screen. The resulting products were mixed with another 1% of graphite plus 1% of Sterotex powder. These mixtures were then fed through a rotary tableting machine equipped with ⅛-inch dies and punches. The resulting pellets were calcined in dry air for 2 hours at room temperature, to 480° F., 2 hours at 480° F., 1 hours at 480° F. to 920° F., and 1 hour at 920° F.

On testing the resulting pellets for mechanical stability, the results obtained were as follows:

TABLE 3

| Catalyst | Adjuvant (20 wt. percent) | Average crushing of pellets, lbs. | Stability tests, percent of pellets cracked after— | |
|---|---|---|---|---|
| | | | Water test | Kerosene test |
| 12 | Al(OH)₃, hydrogel | 27.5 | 70 | |
| 13 | Al₂O₃, hydrate | | 40 | |
| 14 ¹ | 6% SiO₂, 94% Al₂O₃ | 35.5 | 0 | 85 |
| 15 ¹ | 12% SiO₂ 88% Al₂O₃ | | 0 | 95 |
| 16 ¹ | 20% SiO₂ 80% Al₂O₃ | | 0 | 100 |
| 17 ¹ | 40% SiO₂ 60% Al₂O₃ | 37.3 | 0 | 100 |
| 18 ¹ | 87% SiO₂ 13% Al₂O₃ | 40.8 | 60 | |
| 19 ¹ | SiO₂ gel hydrate | | 70 | |

¹ Spray-dried gels in all cases; about 20–30% H₂O.

The foregoing data demonstrate the same trend as shown in Table 2, namely a superior mechanical stability for the catalysts containing alumina-silica adjuvants of 6 to 40% silica, as compared to those containing either pure alumina pure silica, or silica-rich alumina-silica cogels.

EXAMPLE IV

This example demonstrates that the preferred catalysts of Example III, in addition to their superior mechanical stability, are also more active and more resistant to deactivation at hydrocracking temperatures above 600° F. than the catalysts containing a silica-rich adjuvant.

Catalysts 14, 17 and 18 of Example III were tested for hydrocracking activity and deactivation rates, using as the feed an unconverted hydrocracking cycle oil boiling between about 400° and 850° F., containing about 9000 p.p.m. of sulfur (added as thiophene) and 1 p.p.m. of nitrogen, and having an API gravity of 391°. Initial hydrocracking conditions were:

| | |
|---|---|
| Pressure, p.s.i.g. | 1500 |
| LHSV | 9.0 |
| H₂/oil ratio, m.s.c.f./b. | 8.0 |
| Temp. ° F. | (¹) |

¹ As indicated in Table 4, to maintain 60 volume-percent conversion per pass to 400° F. end-point products.

The hydrocracking temperatures are thus inversely proportional to catalyst activity. Deactivation rates were measured in terms of "TIR," i.e., the average daily temperature increase in ° F. required to maintain the constant 60% conversion.

The results were as follows:

TABLE 4

| | Catalyst No. | | |
|---|---|---|---|
| | 14 | 17 | 18 |
| Adjuvant, (20%): | | | |
| SiO₂, percent | 6 | 40 | 87 |
| Al₂O₃, percent | 94 | 60 | 13 |
| Catalyst age, days | 11 | 11 | 11 |
| Hydrocracking temp., ° F | 702 | 747 | 741 |
| TIR, ° F./day | 2.1 | 5.5 | 5.5 |

It is apparent that catalyst No. 14 not only showed a higher activity, but a deactivation rate less than half that of catalysts 17 and 18.

Following this series of tests, catalysts 14 and 18 were tested for activity and deactivation rates in hydrocracking a nitrogen-containing feed obtained by adding 2200 p.p.m. of nitrogen as tert-butylamine to the previous gas oil feed. Upon adding nitrogen to the feed, the space velocity was reduced to 1.5, and temperature then adjusted to maintain the 60% conversion per pass. The results were as follows:

TABLE 5

| | Catalyst No. | |
|---|---|---|
| | 14 | 18 |
| Adjuvant (20%): | | |
| SiO₂, percent | 6 | 87 |
| Al₂O₃, percent | 94 | 13 |
| Catalyst age, days | 18 | 17 |
| Hydrocracking temp., ° F | 718 | 710 |
| TIR, ° F./day | 0.1 | 0.6 |

Thus, in the presence of nitrogen, catalyst No. 18, after 17 days on-stream, appears slightly more active than catalyst No. 14, but its deactivation rate is about six times as high. Thus, after another 15–16 days on-stream, the activity of catalyst No. 14 will exceed that of No. 18.

EXAMPLE V

This example demonstrates that, at hydrocracking temperatures below 600° F., the relative activities and deactivation rates of catalysts 14 and 18 (Example IV) are reversed.

The two catalysts were tested for hydrocracking activity at 1.5 LHSV, using the sulfur- and (substantially) nitrogen-free cycle oil feed employed in Example III, other conditions being the same as described in Example III. The results were as follows:

TABLE 6

| | Catalyst No. | |
|---|---|---|
| | 14 | 18 |
| Adjuvant (20%): | | |
| SiO₂, percent | 6 | 87 |
| Al₂O₃, percent | 94 | 13 |
| Catalyst age, days | 9 | 9 |
| Temperature, ° F. (for 60% conversion) | 568 | 544 |
| TIR, ° F./day | 1.2 | 0.64 |

It is thus apparent that, at temperatures in the range of about 540–570° F., catalyst 18, containing the silica-rich adjuvant is about twice as active (a 20° temperature advantage corresponds to about a doubling of activity), and deactivates at a rate of about half that of catalyst 14 containing the silica-lean adjuvant.

Result analogous to those indicated in the foregoing examples are obtained when other hydrogenating promoters described herein are substituted for the palladium used on the Y sieve. It is hence not intended to limit the invention to the details of the examples, but only broadly as defined in the following claims:

I claim:
1. A method for hydrocracking a hydrocarbon feedstock to produce lower boiling hydrocarbons, which comprises subjecting said feedstock to hydrocracking at ele- vated pressures and temperatures between about 600° and 850° F., in the presence of added hydrogen and a hydrocracking catalyst comprising a copelleted composite of (A) a minor proportion of a Group VIII metal hydrogenating component supported on a major proportion of an alumino-silicate zeolite cracking component characterized by a three-dimensional crystal structure, an alkali metal content less than the equivalent of 3 weight-percent $Na_2O$, a $SiO_2/Al_2O_3$ mole-ratio greater than about 3, and zeolitic cation equivalents comprising mainly hydrogen ions or hydrogen ions plus polyvalent metal ions, and (B) an alumina-silica cogel adjuvant containing about 1–35% $SiO_2$ on a dry weight basis.

2. A method as defined in claim 1 wherein said cogel adjuvant contains about 2–20% $SiO_2$.

3. A method as defined in claim 1 wherein said zeolite cracking component is of the Y crystal type having at least about 20% of its ion-exchange capacity satisfied by hydrogen ions, and having a $SiO_2/Al_2O_3$ mole-ratio between about 3 and 6.

4. A method as defined in claim 1 wherein said Group VIII metal is a noble metal.

5. A method as defined in claim 1 wherein said Group VIII metal is palladium.

6. A method as defined in claim 1 wherein said cogel adjuvant contains a minor proportion of a Group VI–B and/or Group VIII metal hydrogenating component.

7. A method as defined in claim 1 wherein said feedstock contains between about 1 and 2,000 p.p.m. of organic nitrogen.

8. A method for hydrocracking a gas oil feedstock to produce a hydrocarbon product boiling in the gasoline range, which comprises subjecting said feedstock to catalytic hydrocracking at a liquid hourly space velocity above about 1.0, a pressure between about 500 and 3,000 p.s.i.g., and a temperature between about 600° and 850° F., in the presence of added hydrogen and a hydrocracking catalyst comprising a copelleted composite of (A) between about 20% and 90% by weight of an active zeolitic catalyst powder comprising a minor proportion of a Group VIII metal hydrogenating component and a major proportion of an alumino-silicate zeolite cracking component characterized by a three-dimensional crystal structure, an alkali metal content less than the equivalent of 3 weight-percent $Na_2O$, a $SiO_2/Al_2O_3$ mole-ratio greater than about 3, and zeolitic cation equivalents comprising mainly hydrogen ions or hydrogen ions plus polyvalent metal ions, and (B) between about 10% and 80% by weight of an alumina-silica cogel adjuvant containing about 1–35% $SiO_2$ on a dry weight basis.

9. A method as defined in claim 8 wherein said feedstock contains between about 1 and 2,000 p.p.m. of organic nitrogen.

10. A method as defined in claim 8 wherein said zeolite cracking base is of the "Y" crystal type having at least about 20% of its ion-exchange capacity satisfied by hydrogen ions, and wherein said hydrogenating component is a Group VIII noble metal incorporated by ion exchange into the crystal lattice of said cracking base.

11. A method as defined in claim 8 wherein said cogel adjuvant contains about 2–20% $SiO_2$.

12. A method as defined in claim 8 wherein said cogel adjuvant contains a minor proportion of a Group VI–B and/or Group VIII metal hydrogenating component.

References Cited

UNITED STATES PATENTS

| | | | |
|---|---|---|---|
| 3,140,251 | 7/1964 | Plank et al. | 208—120 |
| 3,267,022 | 8/1966 | Hansford | 208—111 |

DELBERT E. GANTZ, Primary Examiner

A. RIMENS, Assistant Examiner

U.S. Cl. X.R.

208—120